US007962523B2

(12) United States Patent
Poola

(10) Patent No.: US 7,962,523 B2
(45) Date of Patent: Jun. 14, 2011

(54) SYSTEM AND METHOD FOR DETECTING TEMPLATES OF A WEBSITE USING HYPERLINK ANALYSIS

(75) Inventor: Krishna Leela Poola, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 538 days.

(21) Appl. No.: 12/101,293

(22) Filed: Apr. 11, 2008

(65) Prior Publication Data

US 2009/0259649 A1   Oct. 15, 2009

(51) Int. Cl.
*G06F 7/00* (2006.01)
*G06F 17/30* (2006.01)
*G06F 13/14* (2006.01)

(52) U.S. Cl. ......... 707/796; 707/790; 707/791; 707/793
(58) Field of Classification Search ............ 707/609, 707/715, 728, 758, 999.005, 999.1, 999.102, 707/796; 380/201; 715/205
See application file for complete search history.

(56) References Cited

U.S. PATENT DOCUMENTS

| 7,698,317 B2 * | 4/2010 | Sasturkar et al. ............ 707/609 |
| 2004/0210575 A1 * | 10/2004 | Bean et al. ......................... 707/6 |
| 2005/0165800 A1 * | 7/2005 | Fontoura et al. .............. 707/100 |
| 2008/0044016 A1 * | 2/2008 | Henzinger .................... 380/201 |

* cited by examiner

*Primary Examiner* — Cam Y Truong
*Assistant Examiner* — Cecile Vo
(74) *Attorney, Agent, or Firm* — Seth H. Ostrow; Ostrow Kaufman LLP

(57) ABSTRACT

The present invention relates to methods, systems, and computer readable media comprising instructions for detecting templates within one or more web pages comprising a website. The method of the present invention comprises generating one or more groups of hyperlinks within a respective web page of the one or more web pages comprising the website. An in-link score is calculated for a given uniform resource locator associated with the one or more web pages comprising the website. The hyperlink groups in which the uniform resource locators associated with the one or more web pages comprising the website appear are identified. A template score is assigned to the identified hyperlinks groups on the basis of the in-link score associated with the uniform resource locators to which the hyperlinks comprising the hyperlink group correspond. The hyperlink groups with template scores exceeding a given template score threshold are thereafter identified as templates.

13 Claims, 5 Drawing Sheets

SYSTEM AND METHOD FOR DETECTING TEMPLATES OF A WEBSITE USING HYPERLINK ANALYSIS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention disclosed herein relates generally to detecting global and local templates. More specifically, embodiments of the present invention provide systems, methods and computer program products for detecting global and local templates of a web site by using hyperlink analysis of the one or more web pages comprising a given web site.

BACKGROUND OF THE INVENTION

A website is a collection of content items, images, videos or other digital content items that are hosted on one or more web servers, usually accessible via the Internet. A given webpage of a website is a document, typically written in HTML and accessible via HTTP, a protocol for transferring information from a web server for display in the web browser of a user. The content items of a given page of a website can usually be accessed from a common root URL called the homepage, and usually reside on the same physical server.

A given website may include several website pages. While a given webpage of a website may contain portions of unique content, often one or more pages of a given website contain one or more common elements, such as templates, which may be identical or nearly identical, and thus, contain duplicative content. For instance, the one or more webpages of a website directed towards the sales of electronics may contain a template that has various links to different areas of the website, such as the links "notebook computers," "televisions," "desktop computer," and "wireless routers," and "cellular phones," which when selected by a user of a client device, direct the user to the appropriate page of the website. When a search provider utilizes a crawler to index pages that may be used by a search engine to generate a search result set, however, multiple pages of a website containing the same content, such as templates appearing on the one or more pages of a website, may be indexed by the crawler. A search engine may thereafter search the indexed pages to identify pages responsive to a given query. However, if the content responsive to a given query appears in the template portion of the one or more pages of a given website that have been indexed by the crawler, the search engine may retrieve the one or more pages of the website on which the template appears, resulting in the retrieval of duplicative content.

The process of retrieving and downloading multiple pages with duplicative content appearing in templates, however, results in wasted bandwidth, storage and CPU cycles for the search provider, and further results in inaccurate search results, as users are presented with multiple pages of a website that may contain identical content. Accordingly, there exists a need for systems, methods and computer program products for detecting templates within the pages of a website.

SUMMARY OF THE INVENTION

The present invention is directed towards systems, methods, and computer readable media comprising program code for detecting templates within one or more web pages comprising a website. The method of the present invention comprises generating one or more groups of hyperlinks within the one or more web pages comprising a website. According to one embodiment of the present invention, generating a group of hyperlinks within a given web page comprises identifying the 2-dimensional coordinates of the one or more hyperlinks within a given web page and placing hyperlinks with 2-dimensional coordinates that differ below a given threshold in a given group of hyperlinks. According to another embodiment of the present invention, generating a group of hyperlinks within a given web page comprises identifying text common to two or more hyperlinks within a given web page. Alternatively, or in conjunction with the foregoing, generating a group of hyperlinks within a given web page comprises placing hyperlinks that are consequent and equidistant in a given group of hyperlinks.

An in-link score for a given uniform resource locator associated with the one or more web pages comprising the website is thereafter calculated. According to one embodiment of the present invention, calculating an in-link score for a uniform resource locator associated with a given web page comprises identifying a frequency with which the one or more web pages comprising the web site point to the uniform resource locator.

The one or more hyperlink groups in which the uniform resource locators associated with the one or more web pages comprising the website appear are thereafter identified. A template score is assigned to the one or more identified hyperlinks groups on the basis of the in-link score associated with the uniform resource locators to which the one or more hyperlinks comprising the hyperlink group correspond. According to one embodiment of the present invention, assigning a template score to a given hyperlink group comprises calculating the average in-link score of the one or more uniform resource locators to which the one or more hyperlinks comprising the hyperlink group correspond. The hyperlink groups with template scores exceeding a given template score threshold are thereafter identified as templates.

The system of the present invention comprises a template detection component operative to generate one or more groups of hyperlinks within a respective web page comprising the website. According to one embodiment of the present invention, the template detection component is operative to identify the 2-dimensional coordinates of the one or more hyperlinks within a given web page and place hyperlinks with 2-dimensional coordinates that differ below a given threshold in a given group of hyperlinks. According to another embodiment of the present invention, the template detection component is operative to identify text common to two or more hyperlinks within a given web page and place hyperlinks with common text within a given group of hyperlinks. Alternatively, or in conjunction with the foregoing, the template detection component is operative to place hyperlinks that are consequent and equidistant in a given group of hyperlinks.

The template detection component is further operative to calculate an in-link score for a given uniform resource locator associated with the one or more web pages comprising the website. According to one embodiment of the present invention, the template detection component is operative to identify a frequency with which the one or more web pages comprising the web site point to a uniform resource locator associated with a given web page and calculate an in-link score for the uniform resource locator associated with the web page based upon the identified frequency.

The template detection component thereafter identifies the one or more hyperlink groups in which the uniform resource locators associated with the one or more web pages comprising the website appear and assigns a template score to the one or more identified hyperlinks groups on the basis of the in-link score associated with the uniform resource locators to which the one or more hyperlinks comprising the hyperlink group correspond. According to one embodiment of the present invention, the template detection component is operative to calculate the average in-link score of the one or more uniform resource locators to which the one or more hyperlinks comprising the hyperlink group correspond and assign a template score to a given hyperlink group based upon the calculated average. The template detection component thereafter identifies the hyperlink groups with template scores exceeding a given template score threshold as templates.

The present invention is further directed towards methods for detecting local templates within one or more web pages comprising a website. According to one embodiment of the present invention, one or more clusters of web pages are generated, a given cluster comprising one or more web pages clustered according to one or more clustering criterion. A sample set for each of the one or more clusters is identified, wherein a given sample set comprises a subset of the one or more web pages comprising a given cluster.

One or more groups of hyperlinks are thereafter generated within the one or more web pages comprising the one or more sample sets. A template score is assigned to the one or more groups of hyperlinks on the basis of in-link scores associated with uniform resource locators to which the one or more hyperlinks comprising the one or more hyperlink groups correspond. The one or more groups of hyperlinks with template scores exceeding a given template score threshold are identified as templates. The presence of the one or more identified templates is inferred with respect to the one or more remaining web pages within the one or more clusters based upon the one or more templates identified in the one or more sample sets associated with the one or more clusters.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

In the following description of the embodiments of the invention, reference is made to the accompanying drawings that form a part hereof, and in which is shown by way of illustration, exemplary embodiments in which the invention may be practiced. It is to be understood that other embodiments may be utilized and structural changes may be made without departing from the scope of the present invention.

Figure 1:
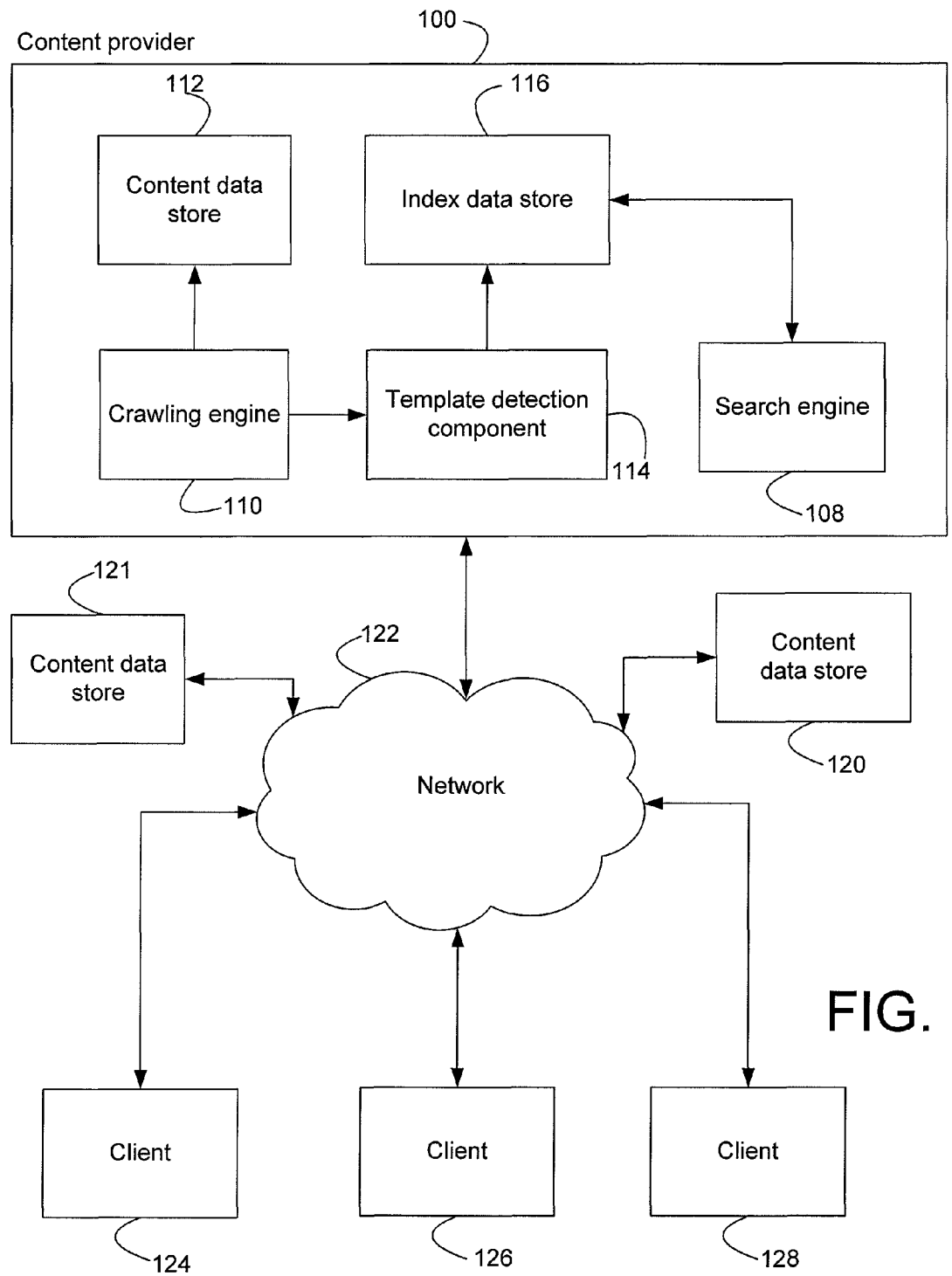
FIG. 1 illustrates a block diagram of a system for detecting global and local templates in one or more web pages of a given website, according to one embodiment of the present invention.

FIG. 1 illustrates one embodiment of a system for detecting templates, including global and local templates, in one or more web pages of a given website. According to the embodiment illustrated in FIG. 1, a crawling engine at a content provider 100 is operative to crawl a network 122 and identify and index websites maintained in one or more local 112 and remote 120 and 121 content data stores. According to one embodiment of the present invention, the crawling engine 110 is operative to crawl through content on the Internet maintained in one or more remote 120 and 121 and local 112 content data stores, and identify and index a given web page from a website that the crawler encounters. Local 112 and remote 120 and 121 content data stores may comprise one or more accessible memory structures such as servers or databases capable of providing for the retrieval and storage of a plurality of web pages comprising one or more websites. The network 122 illustrated in FIG. 1 may comprise any type of computerized network capable of transferring data, such as the Internet.

According to one embodiment of the present invention, the crawling engine 110 identifies and retrieves the one or more web pages comprising a given web site. For example, the crawling engine 110 may identify and retrieve the one or more web pages comprising Yahoo!'s website, which may include, but is not limited to, the web page available at the uniform resource locator ("URL") "www.yahoo.com," as well as the web pages available at the URLs "www.sports.yahoo.com," "www.music.yahoo.com," "www.movies.yahoo.com," "www.shopping.yahoo.com," etc.

As illustrated in FIG. 1, the one or more web pages comprising a given web site retrieved by the crawling engine 110 are delivered to a template detection component 114. The template detection component 114 at the content provider 100 is operative to receive the one or more web pages comprising a given website and identify global and local templates appearing in the one or more web pages. According to one embodiment of the present invention, global and local templates are identified through use of the one or more hyperlinks appearing in the one or more web pages of a given website. Because templates are often composed of a plurality of hyperlinks, identification of the one or more hyperlinks within the one or more web pages of a given website may be used to identify the one or more templates that appear throughout the website.

According to one embodiment of the present invention, the template detection component 114 is operative to section the one or more web pages comprising a given web site according to the one or more hyperlinks appearing in such web pages, generating one or more groups of hyperlinks. For example, the template detection component 114 may be operative to examine the 2-dimensional layout of a given web page and identify the one or more hyperlinks appearing in the web page, as well as the 2-dimensional coordinates of such hyperlinks.

According to one embodiment of the present invention, the template detection component thereafter groups the one or more identified hyperlinks according to their distance from one another, based upon the 2-dimensional coordinates of the respective hyperlinks. For example, the template detection component 114 may group two or more hyperlinks appearing in a given web page that have 2-dimensional coordinates that differ below a predetermined distance threshold.

To illustrate, a first hyperlink may be associated with the 2-dimensional coordinates $X_1=233$, $Y_1=355$, whereas a second hyperlink may be associated with the 2-dimensional coordinates $X_2=273$, $Y_2=445$. The template detection component 114 may identify the difference between the X and Y coordinates associated with the first and second hyperlink, yielding $X_2-X_1=40$, $Y_2-Y_1=90$. The predetermined distance threshold utilized by the template detection component 114 may comprise the numerical value one hundred (100), thus indicating that hyperlinks with 2-dimensional X and Y coordinates that differ below the value one hundred are within the same group. Accordingly, the foregoing first and second hyperlinks, with 2-dimensional X and Y coordinates that differ below the value one hundred, would be placed in a given group of hyperlinks.

Alternatively, or in conjunction with the foregoing, the template detection component 114 is operative to examine the anchor text associated with the one or more hyperlinks appearing in a given web page of a given web site in order to identify one or groups of hyperlinks. For example, a first given hyperlink may be associated with the anchor text "Electronics," and a second hyperlink may be associated with the anchor text "Consumer Electronic." The template detection component 114 may examine the anchor text associated with the first and second hyperlinks and identify that a given hyperlink contains the common term "Electronics." Accordingly, the template detection component 114 may place the first and second hyperlinks in a common hyperlink group.

According to a further embodiment of the present invention, the template detection component 114 examines the link text associated with the one or more hyperlinks appearing in a given web page. For example, the hyperlinks "http://www.yahoo.com/category/electronics" and "http://www.yahoo.com/category/garden" may appear in a given web page. The template detection component 114 may determine that such hyperlinks contain the common link text "http://www.yahoo.com/category," and accordingly, may place such hyperlinks in a common hyperlink group.

The template detection component 114 is thereafter operative to assign template confidence scores for the one or more groups of hyperlinks through use of in-link analysis. According to one embodiment of the present invention, the template detection component identifies the frequency with which a given web page P with URL U is pointed to by the one or more other pages of the web site to which web page P belongs. The frequency with which web page P with URL U is pointed to by the one or more other pages of the web site to which web page P belongs is used to assign an in-link score to U.

The template detection component 114 is thereafter operative to identify the one or more hyperlink groups in the one or more web pages of the website to which URL U belongs. According to one embodiment of the present invention, the template detection component 114 identifies the in-link scores associated with the one or more hyperlinks comprising the one or more hyperlink groups to which U belongs. The template detection component 114 thereafter assigns template confidence scores to the one or more hyperlink groups based upon the one or in-link scores associated with the one or more hyperlinks comprising the one or more hyperlink groups. The template confidence scores associated with the one or more hyperlink groups may be used to ascertain whether a given hyperlink group comprises a template. For example, hyperlink groups associated with a template confidence score exceeding a given template confidence scores threshold may identified as templates, whereas hyperlink groups with template confidence scores below the template confidence score threshold may not be identified as templates.

While the foregoing embodiment describes detection of templates by examining a given one of the one or more web pages comprising a given website, according to another embodiment of the present invention, the template detection component 114 is operative to utilize clustering and sampling techniques for grouping the one or more web pages comprising a given web site and utilizing a sampling of web pages from a given respective cluster to identify templates appearing in the one or more web pages. For example, one or more clustering criterion may be used to cluster web pages comprising a given web site, which may include, but is not limited to, common link text.

The template detection component 114 may examine a sample set of web pages from a given cluster and identify one or more templates, according to the foregoing hyperlink grouping and in-link analysis techniques. The presence of one or more templates identified for the sample set of web pages from the cluster may be used to infer the similar presence of templates in the remaining web pages comprising the cluster. For example, if the template detection component 114 ascertains that the a given sample set of web pages from a given cluster contains a template in the north banner comprising an advertisement, it may be inferred that the remaining web pages in the cluster similarly contain a template in the north banner comprising an advertisement.

According to one embodiment of the present invention, the use of clustering by the template detection component 114 may also be used to identify local templates. According to one embodiment, local templates comprise templates common to a given grouping or cluster of web pages. For example, as previously described, the template detection component 114 may generate one or more clusters of web pages. The clustering of web pages may be performed through use of a variety of clustering techniques which may utilize one or more clustering criterion. For example, pages with similar structure may be grouped. Alternatively, or in conjunction with the foregoing, web pages with similar content may be grouped.

One or more templates common to a given group or cluster generated by the template detection component 114 through use of one or more clustering techniques may be identified through use of the foregoing hyperlink grouping within web pages and subsequent in-link analysis. Template confidence scores may thereafter be assigned to the one or more groups of hyperlinks in the one or more web pages comprising a given cluster.

According to one embodiment of the present invention, the one or more templates identified by the template detection component 114 for the one or more web pages comprising a given web site are indexed in an index data store 116. The index data store 116 may comprise any memory structure, such as a database, CD-ROM, tape, digital storage library, etc., capable of providing for the retrieval and storage of a variety of data types.

According to one embodiment of the present invention, the index data store 116 maintains an index of the one or more web pages comprising a given website, as well as the one or more templates appearing in a respective web page. The index data store may be utilized by a search engine 108 at the content provider to ensure that content identified as responsive to a given query received from a given client device 124, 126, and 128 is not duplicative. For example, the search engine 108 at the content provider 100 may receive a query from a given user of a client device 124, 126, and 128. According to one embodiment of the invention, a given client device 124, 126, and 128 is a general purpose personal computer comprising a processor, transient and persistent storage devices, input/output subsystem and bus to provide a communications path between components comprising the general purpose personal computer. For example, a 3.5 GHz Pentium 4 personal computer with 512 MB of RAM, 40 GB of hard drive storage space and an Ethernet interface to a network. Other client devices are considered to fall within the scope of the present invention including, but not limited to, hand held devices, set top terminals, mobile handsets, PDAs, etc.

The search engine 108 at the content provider may query the index data store to identify one or more web pages responsive to the query received from the user of a client device 124, 126, and 128. Upon identifying the one or more web pages identified as responsive to the query, the search engine 108 may perform a check to determine whether the content within a given web page identified as responsive to the query is contained within a template. For example, page P may contain template T. The search engine 108 may identify page P as responsive to a given query. Accordingly, the search engine 108 may perform a check to determine whether the content within page P identified as responsive to the query is contained within template T. If the content within page P identified as responsive to the query is contained within template T, page P may be excluded by the search engine 108 from the one or more web pages identified as responsive to the query.

Figure 2:
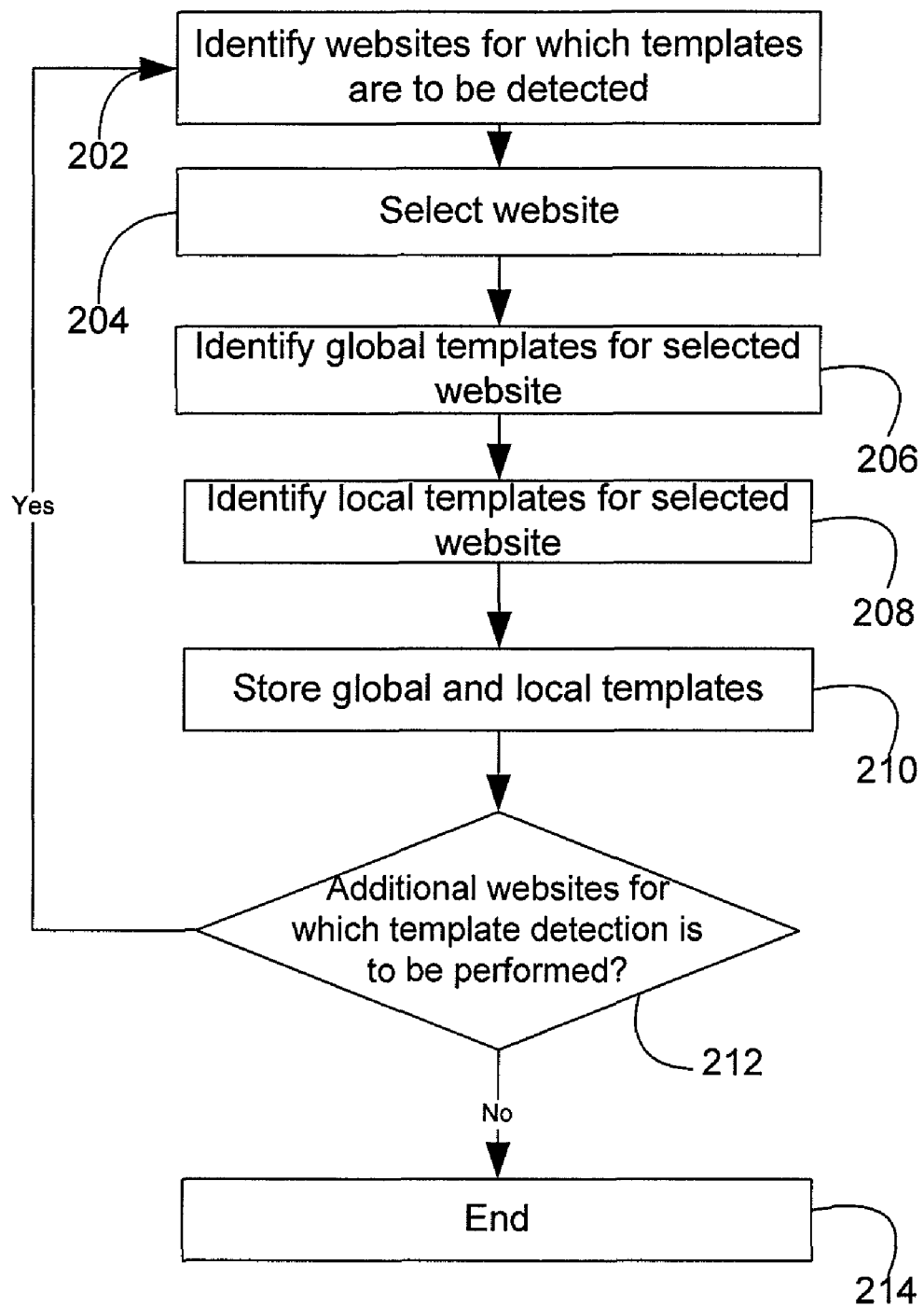
FIG. 2 illustrates a flow diagram presenting a method for detecting global and local templates in one or more web pages of a given website, according to one embodiment of the present invention.

FIG. 2 is a flow diagram illustrating one embodiment of a method for identifying both global and local templates within one or more web pages of one or more web sites. According to the embodiment illustrated in FIG. 2, one or more websites for which templates are to be detected are identified, step 202. The one or more websites for which templates are to be detected may be pre-selected based upon various criteria. For example, the one or more websites that begin with a given letter may be selected. Alternatively, the one or more websites that have been most recently added to a content data store may be selected. Similarly, the one or more websites that are within a given category, such as "sports" or "music" may be selected. The identification of such websites may be performed through use of a crawler, which may crawl a network, such as the Internet.

A given website is selected from among the one or more identified websites, step 204. A given website may comprise one or more web pages, a given web page comprising the web site containing various content, including, but not limited to, text, images, video, audio, etc. According to the embodiment illustrated in FIG. 2, the one or more global templates appearing in the one or more web pages of the selected web site are identified, step 206. According to one embodiment of the present invention, the one or more global templates are identified through use of hyperlink grouping and in-link analysis, as further described herein. A global template, according to one embodiment of the present invention, comprises content that is common with respect to the one or more web pages comprising a given web site.

According to the embodiment illustrated in FIG. 2, the one or more local templates appearing in the one or more web pages comprising the selected website are identified, step 208. Local templates, according to one embodiment of the present invention, comprise content that is common to a given group of one or more web pages comprising a website. For example, a given website may comprise web pages in various categories, such as "notebook computer pages," "cellular phone pages," and "desktop computer pages." A local template may comprise content that is common with respect to the one or more web pages comprising the "notebook computer pages" category of pages." According to one embodiment of the present invention, the one or more local templates are identified through use clustering techniques and subsequent hyperlink grouping and in-link analysis, as further described herein.

The one or more identified global and local templates are thereafter stored, step 210. According to one embodiment of the present invention, an indication of the presence of the global and local templates within the one or more web pages comprising a given website is stored in an index. The index in which the one or more global and local templates are stored may be subsequently utilized by a search engine to ensure that duplicative content is not presented in response to a given query, according to methods described herein.

A check is thereafter performed to determine whether one or more additional websites for which template detection is to be performed require analysis, step 212. If one or more additional websites require analysis, a next website is selected from among the one or more identified websites, step 202. After the one or more identified websites have been analyzed, processing terminates, step 214.

Figure 3:
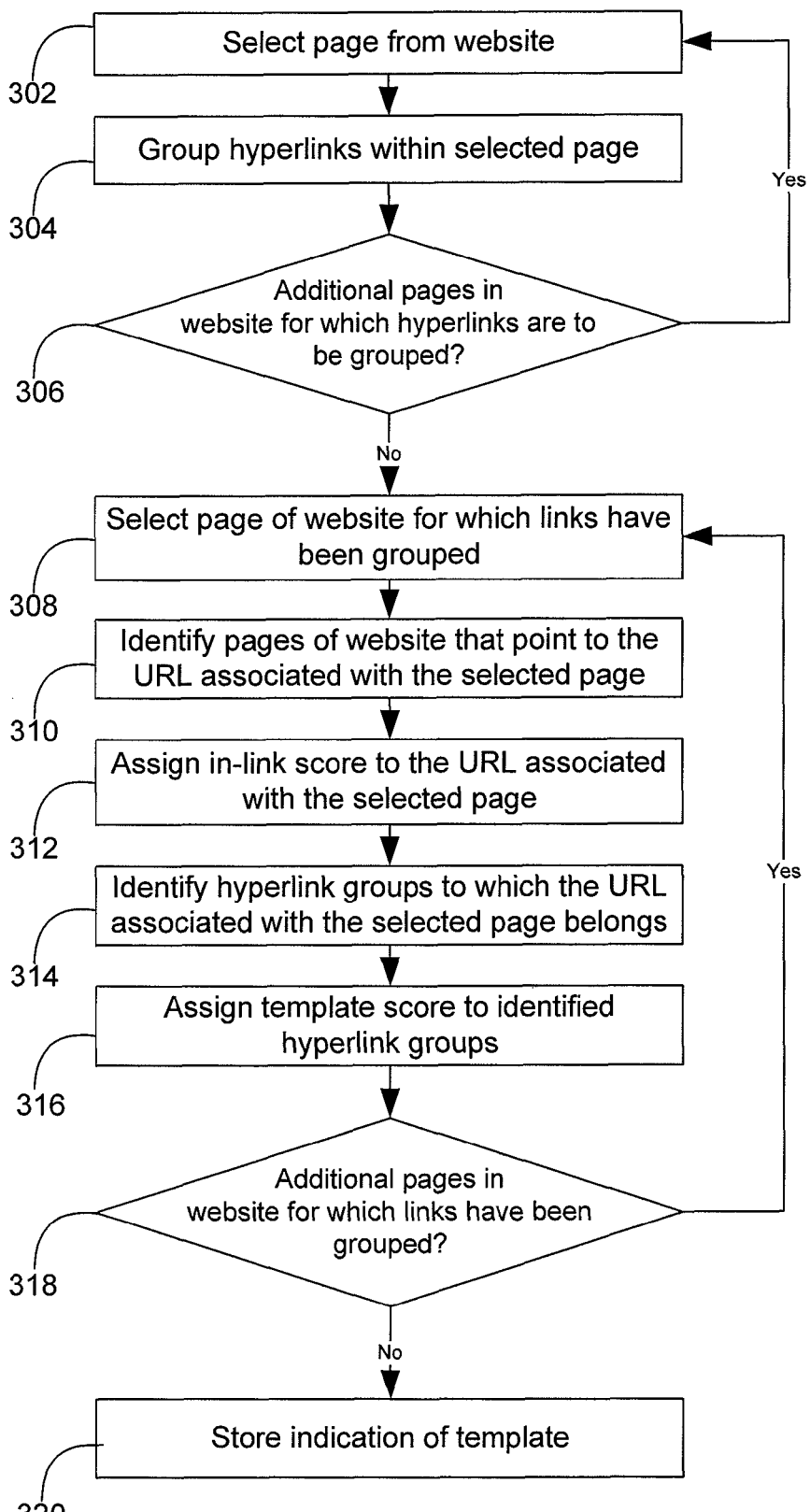
FIG. 3 illustrates a flow diagram presenting a method for detecting global templates through use of grouping hyperlinks in one or more web pages of a given website, according to one embodiment of the present invention.

FIG. 3 is a flow diagram illustrating one embodiment for detecting one or more global templates in the one or more web pages comprising a given website. According to the embodiment illustrated in FIG. 3, a given web page is selected from a given website comprising one or more web pages, step 302. As previously described, templates appearing within the one or more pages of a given website are often composed of a plurality of hyperlinks. Accordingly, to identify the one or more templates within the website, the one or more hyperlinks appearing in the selected web page are thereafter grouped, step 304. According to one embodiment of the present invention, the one or more hyperlinks appearing in the selected web page are grouped based upon their distance according to the 2-dimensional coordinates associated with a respective hyperlink. For example, a comparison may be performed with respect to the X and Y coordinates associated with a respective hyperlink, and hyperlinks associated with X and Y coordinates that are within a predetermined distance may be placed in a given group.

According to another embodiment of the present invention, the one or more hyperlinks appearing in the selected web page are grouped according to the link text appearing in a respective hyperlink. For example, hyperlinks with common text may be placed in a given group. According to yet another embodiment of the present invention, the one or more hyperlinks appearing in the selected web page are grouped according to the anchor text with which a respective hyperlink is associated.

A check is thereafter performed to determine whether one or more additional web pages in the website require analysis with respect to hyperlink grouping, step 306. If one or more additional web pages require analysis, a next web page is selected from among the one or more web pages comprising the website, step 302. After the one or more web pages comprising the website have been analyzed, a given web page from the website is selected for which hyperlinks have been grouped, step 308. The uniform resource locator ("URL") associated with the selected web page is identified, and the one or more web pages comprising the website that point to the URL associated with the selected page are identified, step 310.

The frequency with which the one or more web pages comprising the website that point to the URL associated with the selected page are used to assign an in-link score to the URL associated with the selected page, step 312. According to one embodiment of the present invention, the greater the frequency with which the URL associated with the selected page is pointed to by the one or more web pages comprising the website, the greater the in-link score for the URL.

The one or more hyperlink groups to which the URL associated with the selected web page belongs are thereafter identified, step 314. The in-link scores associated with the one or more URLs comprising the one or more identified hyperlink groups are used to assign a template score for the one or more hyperlink groups, step 316. For example, the average in-link score associated with the one or more URLs comprising a given hyperlink group may be used to assign a template score for the hyperlink group. Similarly, the median in-link score associated with the one or more URLs comprising a given hyperlink group may be used to assign a template score for the hyperlink group.

A check is thereafter performed to determine whether one or more additional web pages comprising the website for which hyperlinks have been grouped require analysis, step 318. If one or more additional web page require analysis, a next web page is selected, step 308. After the one or more web pages comprising the website have been analyzed, an indication of the one or more identified templates is stored, step 320. According to one embodiment of the present invention, an indication of a template is stored for the one or more hyperlink groups with template scores exceeding a given template score threshold.

Figure 4:
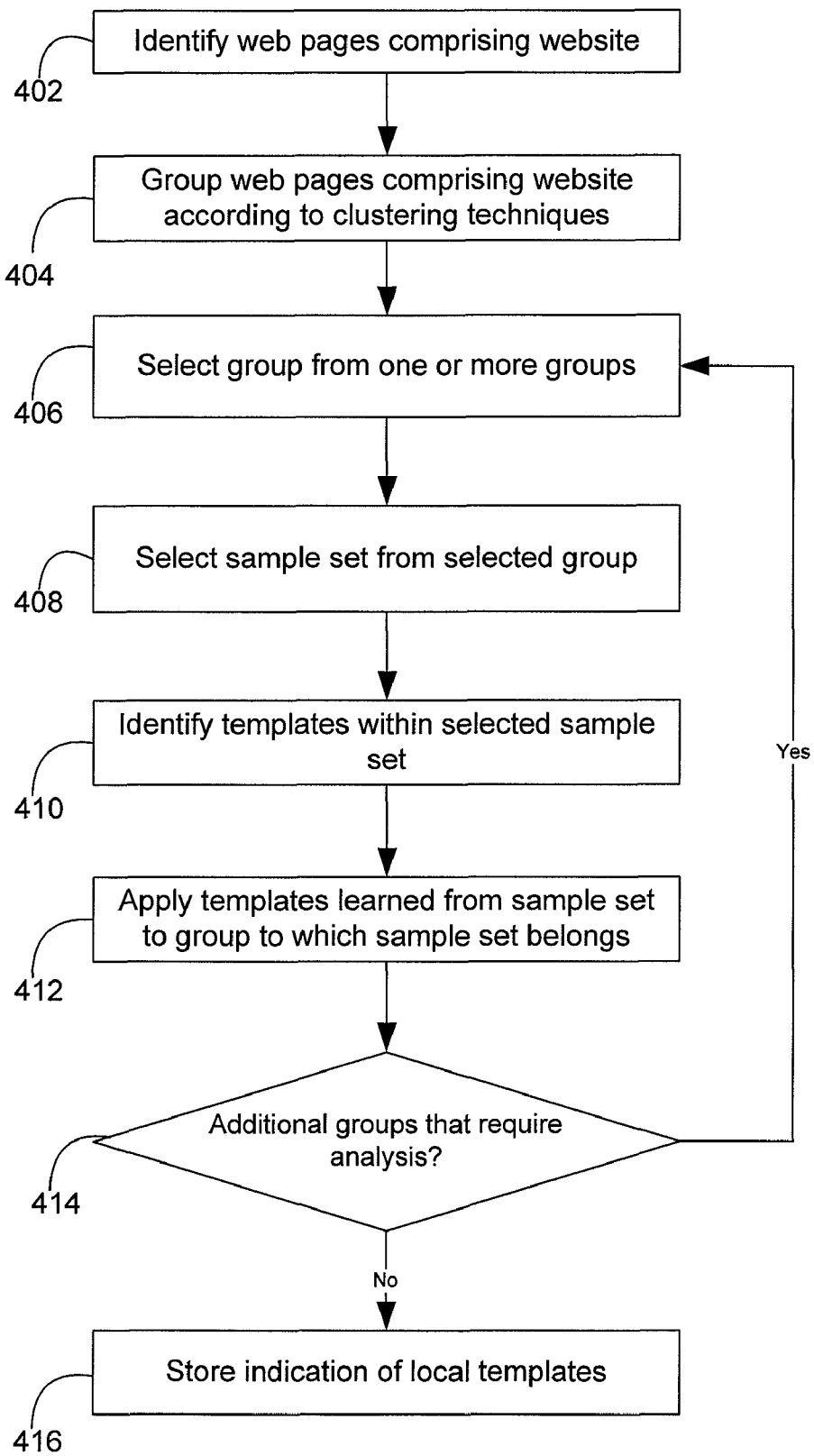
FIG. 4 illustrates a flow diagram presenting a method for detecting local templates through use of one or more clustering techniques, according to one embodiment of the present invention.

FIG. 4 is a flow diagram illustrating one embodiment for detecting one or more local templates with respect to one or more web pages comprising a given web site. According to the embodiment illustrated in FIG. 4, the one or more web pages comprising a given website are identified, step 402. The one or more identified web pages comprising the website are grouped according to one or more clustering techniques using one or more clustering criterion, step 404. According to one embodiment of the present invention, clustering is performed to group web pages by analyzing the URLs associated with a respective web page. According to another embodiment of the present invention, clustering is performed to group web pages on the basis of the content appearing in a respective web page. Alternatively, or in conjunction with the foregoing, clustering is performed to group web pages according to the title of a given web page, as may be indicated in the TITLE tag of a respective web page. Those of skill in the art recognize the plurality of clustering criterion that may be used to group web pages according to one or more clustering techniques.

As illustrated in FIG. 4, a given group is selected from among the one or more groups generated through use of clustering techniques, step 406. A sample set is thereafter selected from the selected group of web pages, step 408. According to one embodiment of the present invention, the size of the sample set may comprise a predetermined amount, such as five (5) web pages from the group of web pages, or a percentage of the one or more web pages comprising the group, such as twenty percent (20%).

One or more templates are identified within the selected sample set through use of the hyperlink grouping and in-link analysis described herein, step 410. The one or more identified templates learned from performing an analysis on the selected sample set are thereafter applied to the group of web pages to which the sample set belongs, step 412. For example, a given sample set S may comprise two web pages from group G comprising ten web pages. A given template T may be identified within sample set S. Accordingly, it may be inferred that the remaining eight web pages in group G similarly have template T.

A check is thereafter performed to determine whether one or more additional groups of web pages generated through use of the foregoing clustering techniques require analysis, step 414. If one or more additional groups of web pages require analysis, a next group of web pages is selected, step 406. After the one or more groups of web pages have been analyzed, an indication of the one or more identified templates within a respective group of web pages is stored, step 416.

Figure 5:
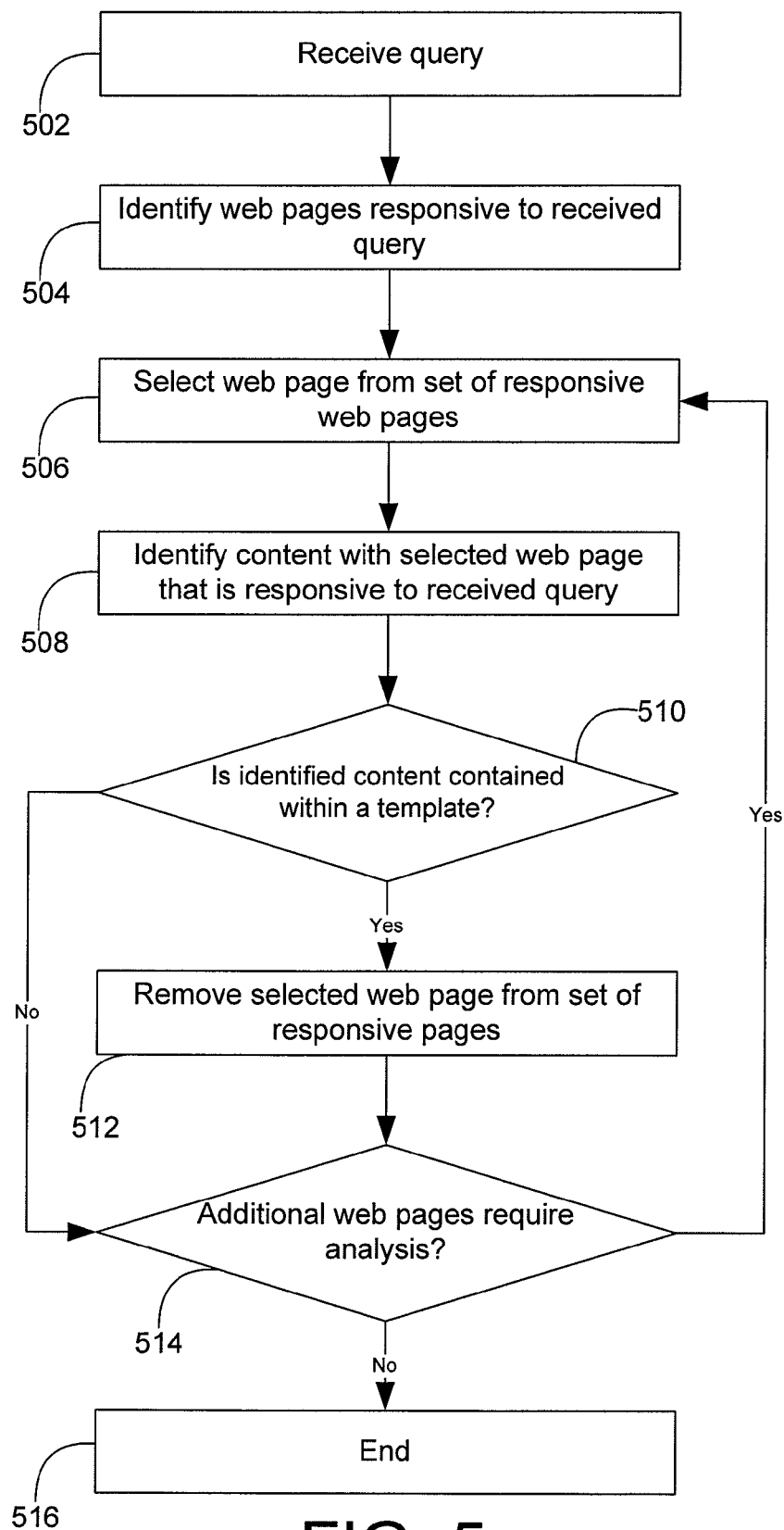
FIG. 5 illustrates a flow diagram presenting a method for utilizing information regarding one or more templates appearing in one or more web pages of a website by a search engine in response to a given query, according to one embodiment of the present invention.

FIG. 5 is a flow diagram illustrating one embodiment of a method for utilizing information regarding one or more templates appearing in one or more web pages of a website by a search engine in response to a given query. According to the embodiment illustrated in FIG. 5, a given query, comprising one or more terms, is received, step 502. A search is performed to identify one or more web pages responsive to the one or more terms comprising the query, step 504. For example, a search may be performed to identify one or more web pages that contain one or more terms that match or are similar to the one or more terms comprising the query.

A given web page is selected from among the one or more web pages comprising the set of web pages identified as responsive to the received query, step 506. The content within the selected web page that is responsive to the received query is thereafter identified, step 508. For example, while a given web page may contain a plurality of content, such as audio, video, text, images, etc., only a portion of such content may be responsive to a given query.

A check is thereafter performed to determine whether the content identified as responsive to the received query comprises or is contained within a template, step 510. The check performed at step 510 may comprise searching an index which maintains an indication of one or more templates in one or more web pages, generated according to methods described herein. If the content identified as responsive to the received query is contained within or comprises a template, the selected web page is removed from the set of one or more web pages identified as responsive to the received query, step 512.

If the content identified as responsive to the received query is not contained within or comprises a template, a check is performed to determine whether one or more additional web pages comprising the set of one or more web pages responsive to the received query require analysis, step 514. If one or more additional pages require analysis, a next web page is selected from among the set of one or more web pages responsive to the received query, step 508. After an analysis has been performed with respect to the one or more web pages comprising the set of one or more web pages responsive to the received query, processing terminates, step 516.

FIGS. 1 through 4 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable storage medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the term "machine readable storage medium is used to generally refer to media such as a random access memory (RAM); a read only memory (ROM); a removable storage unit (e.g., a magnetic or optical disc, flash memory device) and a hard disk. Computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A method for detecting templates within one or more web pages comprising a website, the method comprising:
   generating one or more groups of hyperlinks within a respective web page of the one or more web pages comprising the website;
   identifying 2-dimensional coordinates of the one or more hyperlinks within a given web page;
   placing hyperlinks with 2-dimensional coordinates that differ below a given threshold in a given group of hyperlinks;
   calculating an in-link score for a given uniform resource locator associated with the one or more web pages comprising the website, the in-link score calculated from other web pages of the website that point to the given uniform resource locator associated with the one or more web pares comprising the website;
   identifying the one or more hyperlink groups in which uniform resource locators associated with the one or more web pages comprising the website appear;
   assigning a template score to the one or more identified hyperlinks groups based upon the in-link score of the uniform resource locators associated with the one or more web pages comprising the website corresponding to the one or more hyperlinks of the given hyperlink group, wherein assigning a template score to the given hyperlink group comprises calculating an average in-link score of one or more uniform resource locators to which the one or more hyperlinks comprising the hyperlink group;
   identifying the hyperlink groups with template scores exceeding a given template score threshold as web page templates within a framework of the one or more web pages comprising the website; and
   determining one or more presences of web pare templates in a set of web pares comprising the website on the basis of the hyperlink groups identified as web pare templates.

2. The method of claim 1 wherein generating a group of hyperlinks within a respective web page comprises identifying text common to two or more hyperlinks within a given web page.

3. The method of claim 1 wherein generating a group of hyperlinks within a respective web page comprises placing hyperlinks that are consequent and equidistant in a given group of hyperlinks.

4. The method of claim 1 wherein calculating an in-link score for a uniform resource locator associated with a given web page comprises identifying a frequency with which the one or more web pages comprising the web site point to the uniform resource locator.

5. A system for detecting templates within one or more web pages comprising a website, the system comprising:
   a content server communicatively coupled to one or more client devices via a network, the content server comprising:
   a memory,
   a template detection component operative to:
   generate one or more groups of hyperlinks within a respective web page of the one or more web pages comprising the website;
   identifying 2-dimensional coordinates of the one or more hyperlinks within a given web page;

placing hyperlinks with 2-dimensional coordinates that differ below a given threshold in a given group of hyperlinks;

calculating an in-link score for a given uniform resource locator associated with the one or more web pages comprising the website, the in-link score calculated from other web pages of the website that point to the given uniform resource locator associated with the one or more web pares comprising the website;

identifying the one or more hyperlink groups in which uniform resource locators associated with the one or more web pages comprising the website appear;

assigning a template score to the one or more identified hyperlinks groups based upon the in-link score of the uniform resource locators associated with the one or more web pages comprising the website corresponding to the one or more hyperlinks of the given hyperlink group, wherein assigning a template score to the given hyperlink group comprises calculating an average in-link score of one or more uniform resource locators to which the one or more hyperlinks comprising the hyperlink group;

identifying the hyperlink groups with template scores exceeding a given template score threshold as web page templates within a framework of the one or more web pages comprising the website; and determining one or more presences of web pare templates in a set of web pares comprising the website on the basis of the hyperlink groups identified as web pare templates.

6. The system of claim 5 wherein the template detection component is operative to:
identify text common to two or more hyperlinks within a given web page; and
place hyperlinks with common text within a given group of hyperlinks.

7. The system of claim 5 wherein the template detection component is operative to place hyperlinks that are consequent and equidistant in a given group of hyperlinks.

8. The system of claim 5 wherein the template detection component is operative to:
identify a frequency with which the one or more web pages comprising the web site point to the uniform resource locators associated with a given web page; and
calculate an in-link score for the uniform resource locators associated with the web page based upon the identified frequency.

9. A computer readable storage medium comprising program code that when executed instructs a processor to perform a method for detecting templates within one or more web pages comprising a website, the method comprising:
instructions for generating one or more groups of hyperlinks within a respective web page of the one or more web pages comprising the website;
instructions for identifying 2-dimensional coordinates of the one or more hyperlinks within a given web page;
instructions for placing hyperlinks with 2-dimensional coordinates that differ below a given threshold in a given group of hyperlinks;
instructions for calculating an in-link score for a given uniform resource locator associated with the one or more web pages comprising the website, the in-link score calculated from other web pages of the website that point to the given uniform resource locator associated with the one or more web pares comprising the website;

instructions for identifying the one or more hyperlink groups in which uniform resource locators associated with the one or more web pages comprising the website appear;

instructions for assigning a template score to the one or more identified hyperlinks groups based upon the in-link score of the uniform resource locators associated with the one or more web pages comprising the website corresponding to the one or more hyperlinks of the (liven hyperlink group, wherein assigning a template score to the given hyperlink group comprises calculating an average in-link score of one or more uniform resource locators to which the one or more hyperlinks comprising the hyperlink group;

instructions for identifying the hyperlink groups with template scores exceeding a given template score threshold as web page templates within a framework of the one or more web pares comprising the website; and instructions for determining one or more presences of web pare templates in a set of web pages comprising the website on the basis of the hyperlink groups identified as web page templates.

10. The computer readable storage medium of claim 9 wherein the instructions for generating a group of hyperlinks within a given web page comprises instructions for identifying text common to two or more hyperlinks within a given web page.

11. The computer readable storage medium of claim 9 wherein the instructions for generating a group of hyperlinks within a given web page comprises instructions for placing hyperlinks that are consequent and equidistant in a given group of hyperlinks.

12. The computer readable storage medium of claim 9 wherein the instructions for calculating an in-link score for a uniform resource locator associated with a given web page comprises instructions for identifying a frequency with which the one or more web pages comprising the web site point to the uniform resource locator.

13. A method for detecting local templates within one or more web pages comprising a website, the method comprising:
generating one or more clusters of web pages, a given cluster comprising one or more web pages clustered according to one or more clustering criterion;
identifying 2-dimensional coordinates of the one or more hyperlinks within a given web page;
placing hyperlinks with 2-dimensional coordinates that differ below a given threshold in a given group of hyperlinks;
identifying a sample set for each of the one or more clusters, a given sample set comprising a subset of the one or more web pages comprising a given cluster;
generating one or more groups of hyperlinks within the one or more web pages comprising the one or more sample sets;
assigning a template score to the one or more groups of hyperlinks based upon an in-link scores of uniform resource locators associated with the one or more web pages comprising the web site to which the one or more hyperlinks of the one or more hyperlink groups correspond, the in-link scores calculated from other web pares of the website that point to the uniform resource locators associated with the one or more web pages comprising the web site, wherein assigning a template score to the given hyperlink group comprises calculating an average in-link score of one or more uniform resource locators to which the one or more hyperlinks comprising the hyperlink group;

identifying the one or more groups of hyperlinks with template scores exceeding a given template score threshold as web pare templates within a framework of the one or more web pares comprising the website; and inferring presence of the one or more identified web page templates in the one or more web pages comprising the one or more clusters based upon one or more web pare templates identified in the one or more sample sets associated with the one or more clusters.

\* \* \* \* \*